United States Patent
Aoshima et al.

(10) Patent No.: US 8,020,153 B2
(45) Date of Patent: Sep. 13, 2011

(54) SOURCE CODE CHECKER, SOURCE CODE CHECKING METHOD, PROGRAM FOR CAUSING EXECUTION OF THE METHOD, AND STORAGE MEDIUM FOR STORING THE PROGRAM

(75) Inventors: Takenobu Aoshima, Osaka (JP); Tomoaki Itoh, Tokyo (JP); Takao Yamaguchi, Osaka (JP)

(73) Assignee: Panasonic Corporation, Osaka (JP)

( * ) Notice: Subject to any disclaimer, the term of this patent is extended or adjusted under 35 U.S.C. 154(b) by 1042 days.

(21) Appl. No.: 11/575,824

(22) PCT Filed: Aug. 29, 2005

(86) PCT No.: PCT/JP2005/015625
§ 371 (c)(1),
(2), (4) Date: Mar. 22, 2007

(87) PCT Pub. No.: WO2006/038394
PCT Pub. Date: Apr. 13, 2006

(65) Prior Publication Data
US 2008/0256518 A1 Oct. 16, 2008

(30) Foreign Application Priority Data
Oct. 4, 2004 (JP) ................................ 2004-291987

(51) Int. Cl.
*G06F 9/44* (2006.01)
(52) U.S. Cl. ...................................................... 717/126
(58) Field of Classification Search .......... 717/124–127, 717/132
See application file for complete search history.

(56) References Cited

U.S. PATENT DOCUMENTS

| | | | | |
|---|---|---|---|---|
| 5,854,929 | A * | 12/1998 | Van Praet et al. | 717/156 |
| 6,212,629 | B1* | 4/2001 | McFarland et al. | 712/241 |
| 7,024,661 | B2* | 4/2006 | Leino et al. | 717/126 |
| 7,146,605 | B2* | 12/2006 | Beer et al. | 717/126 |
| 7,421,680 | B2* | 9/2008 | DeLine et al. | 717/126 |
| 2001/0037492 | A1 | 11/2001 | Holzmann | |
| 2001/0047397 | A1* | 11/2001 | Jameson | 709/217 |
| 2002/0054138 | A1* | 5/2002 | Hennum | 345/804 |
| 2002/0100022 | A1 | 7/2002 | Holzmann | |

(Continued)

FOREIGN PATENT DOCUMENTS
EP 1 018 684 A2 7/2000
(Continued)

OTHER PUBLICATIONS

Holzmann, "Logic Verification of ANSI-C Code with SPIN," 2000, SPIN 2000, LNCS 1885, pp. 131-147.*

(Continued)

*Primary Examiner* — Anna Deng
(74) *Attorney, Agent, or Firm* — RatnerPrestia

(57) ABSTRACT

Disclosure is made of a source code checker and a source code checking method, for checking properties related to program behaviors meant by source code for a computer program; of a program for making execute the method; and of a storage medium for storing the program. This source code checking method includes a path extracting step and a checking information determining step. The path extracting step simulates a program described in source code for a computer program preliminarily input, to extract an instruction series to be actually executed. The checking information determining step determines checking information of the source code according to the instruction series extracted in the path extracting step.

11 Claims, 9 Drawing Sheets

U.S. PATENT DOCUMENTS

| | | | |
|---|---|---|---|
| 2005/0223353 A1* | 10/2005 | Keidar-Barner et al. | 717/104 |
| 2005/0223361 A1* | 10/2005 | Belbute | 717/124 |

FOREIGN PATENT DOCUMENTS

| | | |
|---|---|---|
| JP | 64-015836 | 1/1989 |
| JP | 01-237737 | 9/1989 |
| JP | 04-289928 | 10/1992 |
| JP | 04-289928 A | 10/1992 |
| JP | 2000-235486 | 8/2000 |
| JP | 2001-109644 | 4/2001 |
| JP | 2002-288004 | 10/2002 |

OTHER PUBLICATIONS

E. Clarke, D. Kroening; ANSI-C Bounded Model Checker User Manual, [online], School of Computer Science, Carnegie Mellon University, Pittsburgh, PA, USA, Aug. 13, 2003 [retrieved on Oct. 12, 2005]. Internet: <URL:http://www.cs.cmu.edu/modelcheck/cbmc/doc/cbmc-techreport.pdf>.

N. Ono, A. Homma, T. Fukaya; "Proposal of a Program Understanding/Development Process with Mutual Complement of the Static-Analysis and Dynamic-Analysis"; Corporate Research & Development Center, Toshiba Corporation, Nov. 17, 2000, Information Processing Society of Japan, vol. 2000, No. 104, pp. 81-88 (2000-SE-129-11), ISSN 0919-6072, Dai 3.1.3. Setsu o Sansho.

International Search Report for corresponding International PCT Appln. No. PCT/JP2005/015625 dated Nov. 1, 2005.

Clarke, et al., "Behavioral Consistency of C and Verilog Programs Using Bounded Model Checking," Annual ACM IEEE Design Automation Conference, Jun. 2, 2003, pp. 368-371.

* cited by examiner

```
int main(){
  int x,y;
  char *p=0;
  p=malloc(sizeof(char));
  if(x*x+y*y<0){
      free(p);
  }else{
      p++;
  }
  free(p);
  return 0;
}
```

```
int flag1=0;                                    401
int main(){
    int x,y;
    char *p=0;
402 { int_point:
      p=0;
      p=malloc(sizeof(char));
      search(x,y);                              404
403   if(x*x+y*y<0){
          flag1=1;
          free(p);
      }else{
          p++;
      }
      free(p);                                  405
      check_point(flag1);
      return 0;
}
```

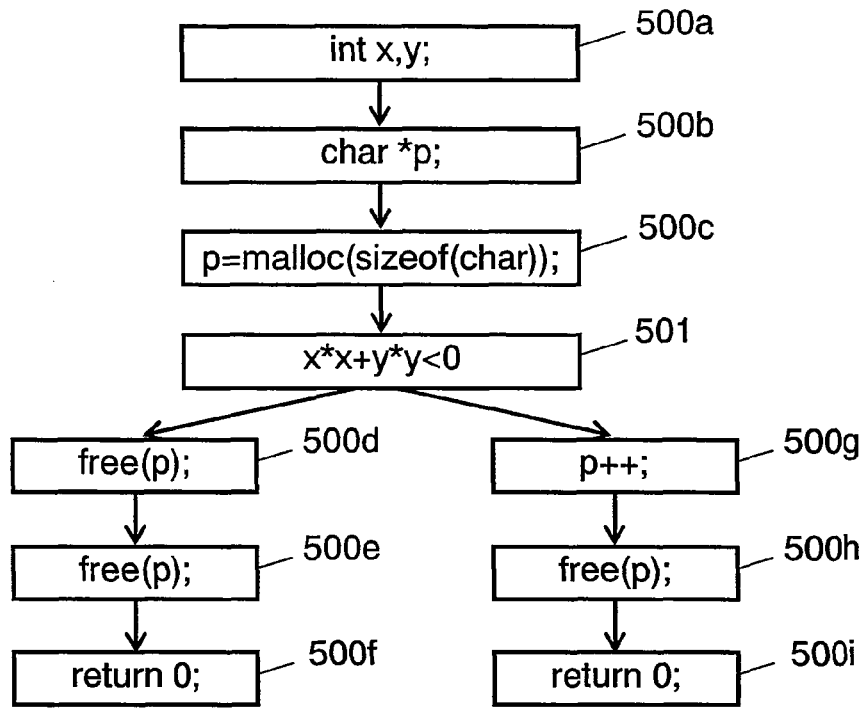

```
                                           504
     int flag1=0;
     int main(){
       int x,y;
       char *p=0;
       p=malloc(sizeof(char));   502
       if(x*x+y*y<0){
           flag1=1;
           free(p);
       }else{
           p++;
       }
                              503
       free(p);
       assert(flag !=1);
       return 0;
     }
```

```
         ┌── 1001
int main(){
    int x,y;
    char *p=0;
    p=wz_malloc(sizeof(char)); ── 1002
    x*x+y*y<0;
    wz_free(p);
    wz_free(p);
    return 0;
}
   └── 1003
```

FIG. 11

```
void wz_add_active_list(void*);
void wz_remove_active_list(void*);

typedef struct_wz_active_cell{
    void *memory;
    int ref_count;
    struct_wz_active_cell *next;
}wz_active_cell;

void *wz_null_pointer=(void*)0;
wz_active_cell wz_origin={(void*)0,0,(void*)0};
void *wz_malloc(int size){
    void *ret_val=malloc(size);
    wz_add_active_list(ret_val);
    return ret_val;
} void wz_free(void *p){
    wz_remove_active_list(p);
    free(p);
}
```

FIG. 12

```
void wz_add_active_list(void* p){
  wz_active_cell *current;
  current=&wz_origin;
  while(current->next !=wz_null_pointer){
    if(current->next==p){
      current->next->ref_count++;
      return;
    }
    current=current->next;
  }
  current->next=malloc(sizeof(wz_active_cell));
  current->next->memory=p;
  current->next->ref_count=1;
  current->next->next=wz_null_pointer;
} void wz_remove_active_list(void *p){
  wz_active_cell *current;
  current=&wz_origin;
  while(current->next !=wz_null_pointer){
    if(current->next->memory==p){
      current->next->ref_count--;
      if(current->next->ref_count==0){
        current->next=current->next->next;
        free(current->next);
        break;
      }
    }
    current=current->next;
  }
} int wz_check_sub(void *p){
  wz_active_cell current;
  current=&wz_origin;
  while(current->next !=wz_null_pointer){
    if(current->next->memory==p){
      return 1;
    }
    current=current->next;
  }
  return 0;
}
```

FIG. 13

```
void wz_check(void* p){
   if(wz_check_sub(p)==0){
      printf("Used non-active object.");
      exit(0);
   }
} int wz_check_on_exit_sub(void *p){
   wz active_cell *current;
   current=&wz_origin
   while(current->next !=wz_null_pointer){
      if(current->next->memory==p){
         current->next->ref_count--;
         if(current->next->ref_count==0){
            return 1;
         }
      }
      current=current->next;
   }
   return 0;
} void wz_check_on_exit(void *p){
   if(wz_check_sub(p)==1){
      printft("Memory leak was detected.");
      exit(0);
   }
}
```

SOURCE CODE CHECKER, SOURCE CODE CHECKING METHOD, PROGRAM FOR CAUSING EXECUTION OF THE METHOD, AND STORAGE MEDIUM FOR STORING THE PROGRAM

This application is a U.S. National Phase Application of PCT International Application No. PCT/JP2005/015625 filed Aug. 29, 2005.

TECHNICAL FIELD

The present invention relates to a source code checker and to a source code checking method, for checking properties related to program behaviors meant by source code for a computer program; to a program for making execute the method; and to a storage medium for storing the program.

BACKGROUND ART

Conventional source code checkers include a source code analyzer for checking properties related to program (also described as "application program" hereinafter) behaviors meant by source code. Source code analyzers include a source code model checker for analyzing source code using model checking technique.

Behaviors of an application program expressed by source code means a series of program operation, instructed by a series of instructions described in source code. Properties related to these behaviors include a property of, if memory is dynamically allocated, reliably releasing the memory, and a property of, if an instruction in a program is executed, reliably executing the corresponding specific instruction sometime.

Model checking refers to, when specifications expressing properties to be checked and a target model for checking are input, judging whether or not the model has properties expressed by the specifications. An apparatus for performing model checking is called a model checker, and what describes a target model for checking is referred to as model description. A language for describing a model varies in many ways depending on a model checker. In a case of the SPIN model checker, for example, the language for describing a model is what is called Promela.

The SPIN model checker is a checker for checking whether or not a system modeled as a finite-state transition system exhaustively satisfies a checking expression described in a linear-time logical expression in full state search. The SPIN model checker is disclosed in *The Model Checker Spin*, G. J. Holzmann, *IEEE Trans. on Software Engineering*, Vol. 23, No. 5, pp. 279-295, May 1997, for example.

Source code model checking refers to model checking targeted for checking source code, a term used in contrast with hardware model checking, which is targeted for hardware such as a logical circuit.

Conventional source code checkers include those using a conversion table for translating source code into a language to be input to a model checker. The makeup is disclosed in U.S. patent applications No. 2001/0037492 and No. 2002/0100022, for example. FIG. 14 is a block diagram illustrating the makeup of the conventional source code checker described in No. 2001/0037492.

The model checker shown in FIG. 14, which is a conventional source code checker, inputs source code 1301 under checking from source code input unit 1302. Next, this source code checker composes a control flow graph according to the source code 1301 accepted by source code input unit 1302, at source code conversion table generator 1303. Then, the source code checker generates source code conversion table 1304 that is a collection of parallel translation examples described in a corresponding model description language such as Promela, from the control flow graph, for each statement of source code 1301 under checking.

Next, model description generator 1305 converts source code 1301 into a model description language using parallel translation examples included in source code conversion table 1304. Specifications input unit 1307 delivers specifications 1308 to be checked describing specifications expressing properties of source code 1301 to be checked having been input, to model checker executing unit 1306. Then, model checker executing unit 1306 executes model checking using specifications 1308 supplied from specifications input unit 1307 and the model description generated by model description generator 1305, and outputs checking result 1309.

If source code conversion table 1304 automatically generated is undesirable for the user of the source code model checker, correcting means 1310 of the user needs to correct source code conversion table 1304 as appropriate. Such cases include one where source code 1301 under checking handles what is not included in the source code, such as communications with an external module. Source code conversion table generator 1303 often fails to present a correct translation example, which the user needs to supplement.

A model description language used for source code model checking (e.g. Promela) is different from a programming language for describing source code (e.g. C language) in expressive power. Specifically, some transition conditions can be described in a programming language, but not in a model description language. Accordingly, behaviors meant by source code can be essentially difficult to accurately translate into a model description language, and generating an appropriate source code conversion table is often difficult. Thus, a model description is not available that accurately reproduces behaviors meant by source code under checking, often resulting in inaccurate checking.

In detail, model checking is performed in the next procedure. That is, a labeled directed graph is generated according to a model description, and judgement is made whether or not the graph satisfies constraints meant by specifications expressed by a linear-time logical expression, for example. A linear-time logical expression is formed by adding a concept of time to a propositional logical expression, widely used when such as describing a state transition model formally.

A labeled directed graph is composed of a set of nodes and links. Each link represents relationship between two nodes, and a link connecting the nodes together has a direction. More specifically, a labeled directed graph has two nodes each corresponding to the origin and endpoint of a link, where each node has a label attached.

A labeled directed graph is regarded as a state transition diagram when each node of the labeled directed graph is regarded as a state; and movement from a node to another along the direction of the link, as a state transition. A label at each node is regarded as an event occurring in each state. Model checking judges whether or not a series of event occurrence satisfies constraints of given specifications.

However, a labeled directed graph is not provided with a transition condition. A transition condition is one for judging to which link (i.e. which node of the endpoint of a link) transition is to be made if plural links with a node as its origin are present. Absence of a transition condition means that a state corresponding to a node of which link is regarded as the next state is arbitrarily selectable if plural links are present. Model checking usually judges whether or not constraints of specifications under checking are violated, and thus the worst case is always selected for an arbitrarily selectable transition destination.

However, a state transition diagram expressing behaviors meant by source code is generally expressed by a labeled directed graph with a transition condition. For a conditional clause expressed by an 'if' statement, for example, a true or false value of the conditional expression determines a next state.

The above-described reason can cause the following problem. That is, literal translation involves essential difficulty between a model description language implicated by a labeled directed graph without a transition condition, and a general programming language implicated by a labeled directed graph with a transition condition. Further, the conventional method can make it difficult for the user of the checker to correct the source code conversion table.

In detail, the user of the checker, when correcting a source code conversion table, needs to understand a model description described in the conversion table. The user further needs to locate a part that does not accurately reflect behaviors of the application program meant by the source code, and needs to provide an alternative translation for such a part. Moreover, while considering so that model checking is appropriately performed for a part other than the source code under checking, the user needs to provide a model description complementing the part. These jobs can involve difficulty and complications even if the user is an expert on model checking.

SUMMARY OF THE INVENTION

The present invention provides a source code checker and a source code checking method for checking behaviors meant by source code under checking more accurately; a method execution program for making execute the method; and a storage medium for storing the program.

The present invention includes a path extracting step for extracting an instruction series to be actually executed by simulating an application program described in source code for a computer program preliminarily input; and a checking information determining step for determining the checking information of the source code according to the instruction series extracted in the path extracting step. According to the present invention, behaviors meant by source code can be checked more accurately.

BRIEF DESCRIPTION OF DRAWINGS

FIG. 5 illustrates a model graph made according to the result of extracting a path from the source code shown in FIG. 2.

FIG. 6 illustrates a model description generated according to the model graph in FIG. 5.

FIG. 11 is a first figure illustrating a part of the verification program in the same embodiment.

FIG. 12 is a second figure illustrating a part of the verification program in the same embodiment.

FIG. 13 is a third figure illustrating a part of the verification program in the same embodiment.

REFERENCE MARKS IN THE DRAWINGS

Figures 1, 2:
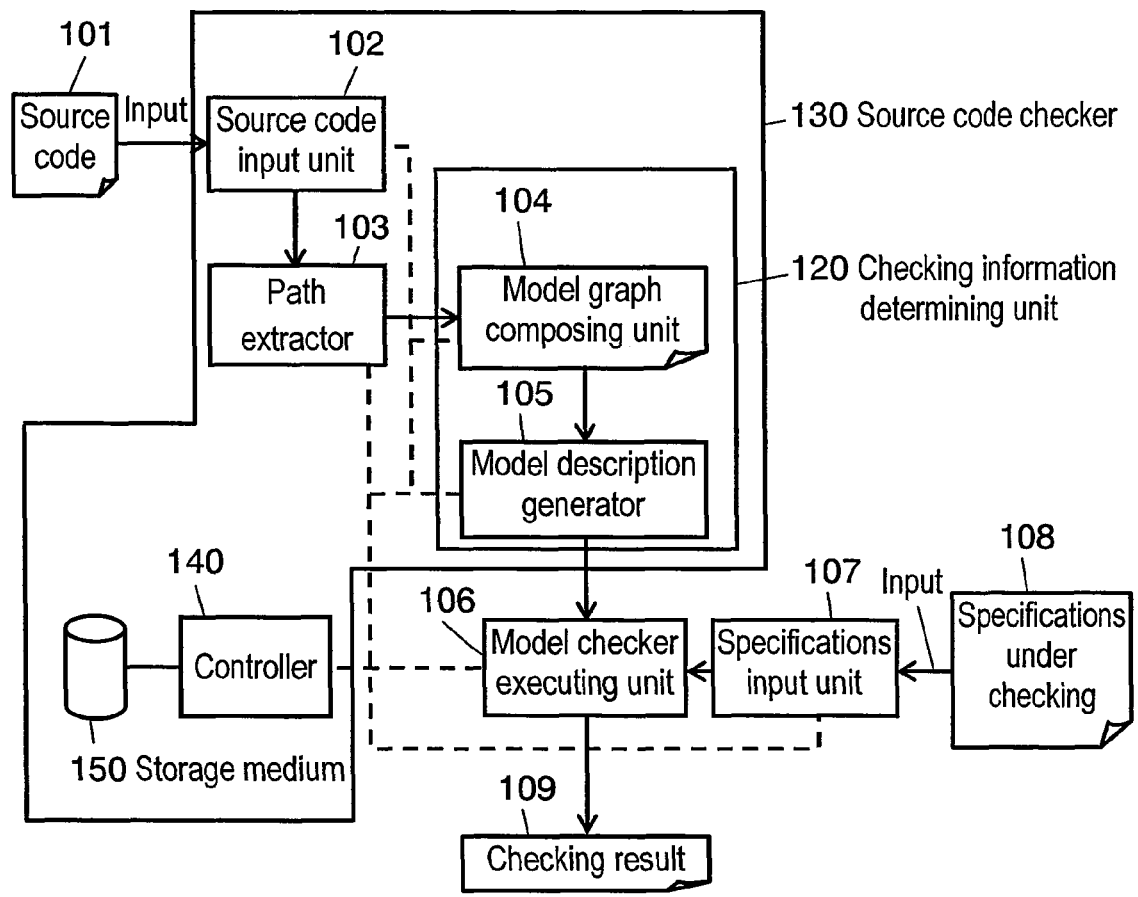
FIG. 1 is a block diagram of a source code checking system including a source code checker according to the first exemplary embodiment of the present invention.
FIG. 2 illustrates an example of source code under verification in the same embodiment.

100, 600 Source code checking system
102 Source code input unit
103 Path extractor
104 Model graph composing unit
105 Model description generator
106 Model checker executing unit
107 Specifications input unit
120,122 Checking information determining unit
130, 131, 700 Source code checker
140 Controller
150 Storage medium
601 Automatic specifications generator
701 Verification program generator
702 Verification program executing unit

DETAILED DESCRIPTION OF PREFERRED EMBODIMENTS

A source code checking method of the present invention includes a path extracting step and a checking information determining step. The path extracting step simulates an application program described in source code for a computer program preliminarily input, to extract an instruction series to be actually executed. The checking information determining step determines checking information of the source code according to the instruction series extracted in the path extracting step.

This allows source code to be checked without deviating from program behaviors meant by source code under checking.

In the source code checking method of the present invention, the checking information determining step may include a model graph composing step and a model description generating step, both placed before a model checking executing step that performs model checking of source code according to a model description and specifications expressing properties of checking the source code. The model graph composing step composes a model graph from the instruction series extracted in the path extracting step. The model description generating step generates a model description from the model graph composed in the model graph composing step. The model checking executing step may check source code according to a model description generated by the model description generator and specifications preliminarily input.

This method prevents a model description from further being generated that deviates from program behaviors meant by source code under checking using model checking technique. This avoids incorrect abnormal detection caused by a model description corresponding to a part deviating from program behaviors meant by source code under checking. That is, a model description deviating from behaviors of source code does not exist in the method of the present invention. Accordingly, an incorrect checking result of not satisfying specifications is not reported, although the behaviors of the original source code satisfy constraints of the specifications under checking. Meanwhile, extracting a model graph before performing model checking allows leaving room for applying an efficiency-enhancing means such as degenerating the model graph.

In the source code checking method of the present invention, the path extracting step may convert the source code into a logical expression and judge satisfiability of the logical expression, to extract an instruction series the source code of which can be executed.

This method allows extracting program behaviors by simulating the program given by source code under checking to judge satisfiability of conditional statements. In this way, making source code under verification executable by compiling and linking is not required, thus enabling model checking targeted for only a part of the source code set, unlikable for example, out of a series of source code group.

The source code checking method of the present invention may further include an automatic specifications generating step for generating specifications automatically, where specifications preliminarily input are those generated in the automatic specifications generating step.

This method dispenses with further inputting specifications manually. That is, the method saves manual input of specifications, troublesome and sometimes requiring expertise.

In the source code checking method of the present invention, the automatic specifications generating step may automatically generate specifications meaning that a program described in source code does not use memory incorrectly.

This method further enables model checking related to incorrect memory use without requiring knowledge on incorrect memory use. This method also enables model checking related to incorrect memory use by a program without requiring manual input of specifications.

Further, in the source code checking method of the present invention, the checking information determining step may include a verification program generating step and a verification program executing step. The verification program generating step generates a verification program for independently judging whether or not an extracted instruction series incorrectly uses memory. The verification program executing step executes the generated verification program.

This enables source code checking without executing the model checking executing step, namely dispenses with using an external model checking method, thus improving portability and convenience.

The method execution program of the present invention is one for making a computer execute the above-described source code checking method. The storage medium of the present invention is one for storing the above-described method execution program.

Hereinafter, a description is made for exemplary embodiments of the present invention with reference to the related drawings.

First Exemplary Embodiment

A description is made for a source code checking system including a source code checker according to the first exemplary embodiment of the present invention using FIG. 1. FIG. 1 is a block diagram of the source code checking system including the source code checker according to the first embodiment.

Source code checking system 100 according to the first embodiment is a computer system equipped with source code checker 130, model checker 106, and specifications input unit 107. Source code checker 130 is equipped with source code input unit 102, path extractor 103, checking information determining unit 120, controller 140, and storage medium 150. Checking information determining unit 120 is equipped with model graph composing unit 104 and model description generator 105.

Source code input unit 102 inputs source code 101, a computer program. Path extractor 103 extracts an instruction series to be potentially executed out of source code 101 accepted by source code input unit 102, and sends the extracted instruction series to model graph composing unit 104. Model graph composing unit 104 summarizes information on a path extracted by path extractor 103 into a graph, and sends the graph to model description generator 105.

Model description generator 105 generates a model description according to the graph composed by model graph composing unit 104, and sends the generated model description to model checker executing unit 106 outside source code checker 130.

Controller 140 controls each component of source code checker 130 according to the method execution program for making execute the source code checking method stored in storage medium 150. Storage medium 150 is a device such as a hard disk storage device, semiconductor memory, or CD-ROM.

Model checker executing unit 106 executes model checking using specifications 108 under checking describing constraints expressing properties of source code 101 under checking accepted from specifications input unit 107, and a model description generated by model description generator 105, and outputs checking result 109. Above-described controller 140 may control model checker executing unit 106 according to a program stored in storage medium 150. Each component of the source code checker may be implemented by hardware using random logic, software making a computer execute, or a composite of hardware and software.

Next, a detailed description is made for path extractor 103.

Path extractor 103 first composes a control flow graph according to source code 101 under checking.

A control flow graph is what expresses the control structure of source code 101, which is composed of three basic elements: a process block node, judgement node, and merge node. A process block node is a node in a graph, corresponding to an instruction series of sequential source code without branches due to judgement. A judgement node is a node in a graph, meaning a point where an instruction series to be executed according to a true or false value of an expression branches. A merge node is a node in a graph, meaning a point where plural instruction series merge.

Figures 3, 4:
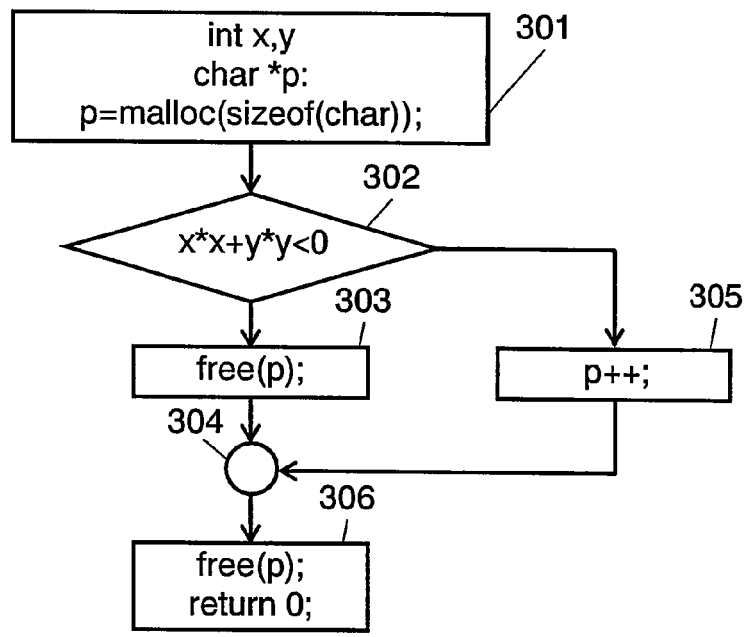
FIG. 3 illustrates a control flow graph made according to the source code shown in FIG. 2.
FIG. 4 illustrates source code modified from the source code shown in FIG. 2 to extract a path.

FIG. 2 illustrates an example of source code in the embodiment, and FIG. 3 illustrates an example of a control flow graph composed according to the source code in FIG. 2.

The graph of FIG. 3 is composed of process block nodes 301, 303, 305, 306, judgement node 302, merge node 304, and directed links connecting each node.

Path extractor 103 generates such a control flow graph.

Next, path extractor 103 extracts an instruction series to be potentially executed according to the control flow graph composed, namely an execution path. Here, an example is shown of execution path extraction in C language. However, an instruction series can be extracted by the same method in a language such as C++ and Java (registered trademark).

Path extractor 103 modifies source code 101 under checking, compiles the modified source code, and executes it to extract an execution path. Modification of source code 101 performed by path extractor 103 is that for extracting an instruction series to be executed and does not influence behaviors meant by original source code 101. That is, path extractor 103 simulates source code 101 and then extracts the instruction series executed then.

Hereinafter, a concrete description is made for the process of path extractor 103 using FIGS. 3, 4. FIG. 4 illustrates an example of the source code shown in FIG. 2, modified to extract an execution path.

Statement 401 is one for defining and initializing a flag variable. Statement 402 shows a label expressing a start point and an initialization statement included in a variable definition. Statement 403 is a function for modifying a variable having an indefinite value. Statement 404 is one for substituting 1 for a flag variable corresponding to a branch instruction. Statement 405 is a function for judging whether or not all the flag variables are 1.

First, path extractor 103 defines flag variables of the number same as that of judgement nodes included in the control flow graph, in an area for defining global variables. In the example of FIG. 4, path extractor 103 defines an area for defining global variables outside the area beginning with "int main( ){" and ending with the last "}" corresponding to the "{", namely in an area where statement 401 is present or below the last "}".

The flag variables are assumed to be global variables having different names, initialized with 0, and having areas for storing a binary value of 0 or 1. If the control flow graph includes three judgement nodes, for example, extractor 103 describes "int flag1=0, flag2=0, flag3=0;" in the area for defining global variables at the top of the source code to be modified.

Next, path extractor 103 selects one branch for each judgement node 302 included in the control flow graph and inserts statement 404 for substituting 1 for a flag variable, at the node of the instruction series (free(p);) corresponding to process block node 303 as the branch destination.

Path extractor 103 repeats substituting 1 for a flag variable not yet used. Further, path extractor 103 inserts function 403 for modifying a variable with an indefinite value, immediately before a branch statement corresponding to each judgement node, in order to search for an execution path.

A variable with an indefinite value means one having a value supplied from something outside the range described by the source code (e.g. from the program user); a value determined by random numbers; and a value determined depending on the above value. Data flow analysis judges whether or not each variable has an indefinite value.

The function to be inserted, taking variables with indefinite values, included in a corresponding branch statement as its arguments, modifies the values of each variable. Further, this function assigns a combination of values different every time it is called, to each variable passed as the arguments.

Next, path extractor 103 inserts a label indicating a start point ("init_point" at the first line of 402) before the statement ("p=malloc(sizeof(char))" immediately after 402 in FIG. 4) corresponding to the instruction to be first executed (excluding variable definition statements) in source code 101, and appends an instruction for initializing variables ("p=0;" at the second line of 402) included in the variable definition statement, immediately after the line where the label has been inserted.

Next, path extractor 103 judges whether or not 1 is assigned to all the flag variables respectively inserted in the above-described procedure, immediately before ("return 0;" immediately after 405) the statement meaning end of program included in the source code, and ends if 1 is inserted for all; otherwise, inserts a function ("check_point(flag1)" shown by 405) for returning to the label inserted in the above-described procedure.

If the program ends here, path extractor 103 delivers information on the instruction series executed, to model graph composing unit 104.

Path extractor 103 thus inserts statements 401 through 405 into the source code shown in FIG. 2.

This enables path extractor 103 to extract all the instruction series to be potentially executed by repeating substitution of a flag variable for all the combinations of judgement nodes.

Here, if the source code is large-scale and the number of combinations is enormous, it is preferable to discontinue the above-described extraction as appropriate depending on the computer resources and to go to the procedure described below.

Next, a detailed description is made for model graph composing unit 104 included in checking information determining unit 120.

The execution by path extractor 103 causes the set of the instruction series executed to be delivered to model graph composing unit 104. Model graph composing unit 10 composes a model graph according to this set. The model graph here is composed of a set of nodes and links, each node has its corresponding statement appended as a label, and each link is a directed link to which origin and endpoint a node in the graph corresponds respectively.

Hereinafter, a description is made for a method by which model graph composing unit 104 composes a model graph.

First, model graph composing unit 104 extracts one instruction series out of the instruction series set. Next, model graph composing unit 104 generates a node attached with a label indicating a statement corresponding to the occurrence order of instructions of this series, and generates a link with a newly generated node and that generated immediately before it as its origin and endpoint, respectively. This operation results in composing a series of model graph corresponding to one series of instruction selected. Here, the node first generated is referred to as an initial node.

Next, model graph composing unit 104 (1) extracts one instruction series out of the instruction series set to compose one series of model graph in the same way as above.

Next, model graph composing unit 104 (2) compares the model graph already composed and the respective initial nodes, and if a node attached with a label corresponding to a different statement appears, model graph composing unit 104 branches the graph and add a new model graph corresponding to the remaining instruction series, to the original model graph.

Next, model graph composing unit 104 (3) executes the procedure of returning to (1) until elements of the instruction series set are exhausted, sequentially from (1). This enables composing a model graph. Then, model graph composing unit 104 delivers the composed model graph to model description generator 105. The graph shown in FIG. 5 is a model graph composed according to the result of extracting a path from the source code shown in FIG. 2.

Model graph composing unit 104 thus composes a model graph with a transition condition as shown in FIG. 5, that is to say, a model graph accurately reproducing behaviors meant by the source code.

Next, a detailed description is made for model description generator 105a. Here, an example is given of generating a model description (illustrated in FIG. 6) in Promela, which is a model description language for the SPIN model checker, according to the model graph shown in FIG. 5 delivered from model graph composing unit 104. The model description generated here is an example of a character string. FIG. 6 illustrates a model description in Promela generated according to the model graph in FIG. 5.

First, model description generator 105 generates a start point of the model described in Promela. The description of a start point here is "proctype main( ){" at 601.

Next, model description generator 105 executes the following while sequentially selecting nodes from the start point of the model graph.

First, model description generator 105 (1) appends "L:skip;" to the model description as shown by 602a through 602i in FIG. 6, if the statement next to the selected node is not a branch statement (shown by 500a through 500i in FIG. 5), where the label attached to the node is assumed to be "L".

Next, model description generator 105 select a node in the subsequent model graph to execute (1) or the flowing (2).

(2) Model description generator 105 appends "L: if ::A ::B fi;" to the model description shown by 603 in FIG. 6, if the statement next to the selected node is a branch statement (shown by 501 in FIG. 5), where the label attached to the node is assumed to be "L".

Next, model description generator 105 selects the nodes at the respective branch destinations and executes (1) and (2) respectively, to rewrite A and B above, which are shown by 604 and 605 in FIG. 6, respectively.

Then, model description generator 105 repeats the above operation until all the nodes of the model graph are selected and executed. Finally, model description generator 105 appends "}" shown by 606 in FIG. 6, to the model description.

Model description generator 105 delivers the model description obtained here to model checker executing unit 106.

Then, model checker executing unit 106 inputs the model description delivered from the above-described model description generator and the specifications received from specifications input unit 107, to the model checker, and outputs the result of the model checking as checking result 109.

According to the first embodiment, as described hereinbefore, path extractor 103 simulates an application program described in source code to extract an instruction series to be actually executed. Then, a model graph can be composed from an instruction series extracted by model graph composing unit 104 included in checking information determining unit 120, and a model description can be generated from the model graph composed by model description generator 105, for source code checking.

In this way, simulating source code prevents a model description from being generated that deviates from program behaviors meant by source code under checking. This avoids incorrect abnormal detection caused by a model description corresponding to a part deviating from program behaviors meant by source code under checking. Accordingly, an incorrect checking result of not satisfying specifications, due to the presence of a model description deviating from the behaviors, is not reported, although the behaviors of the original source code satisfy constraints of the specifications under checking.

Meanwhile, extracting a model graph before performing model checking allows leaving room for applying an efficiency-enhancing means such as degenerating the model graph.

In addition, the first embodiment dispenses with a source code conversion table conventionally required, and thus one who checks source code does not need to correct a source code conversion table.

Second Exemplary Embodiment

A description is made for the second exemplary embodiment of the present invention. In the second embodiment, path extractor 103 simulates a program by the method in which path extractor 103 converts source code into a logical expression and judges the satisfiability of the logical expression to extract an instruction series to be executed actually. Judgement of satisfiability of a logical expression is to judge whether or not an allocation of a variable value that makes all the given logical expressions 1 (i.e. true) exists.

The makeup of a source code checking system including the source code checker according to the second embodiment is similar to that of the first embodiment, and thus the source code checker according to the first embodiment is described using FIG. 1.

In source code checker 130 according to the second embodiment, path extractor 103 converts source code 101 into a logical expression and judges the satisfiability of the logical expression to extract an instruction series executing the source code.

Here, path extractor 103 converts source code 101 into a logical expression and uses CBMC (Bounded Model Checker for ANSI-C programs) as a tool for judging satisfiability. CBMC is a model checker that is supplied with source code in C language, converts it into a logical expression, and judges the satisfiability of the logical expression, to check properties of the source code having been input. Path extractor 103 utilizes a function for checking the property of always satisfying an assert statement, to extract a path.

Figures 7, 8:
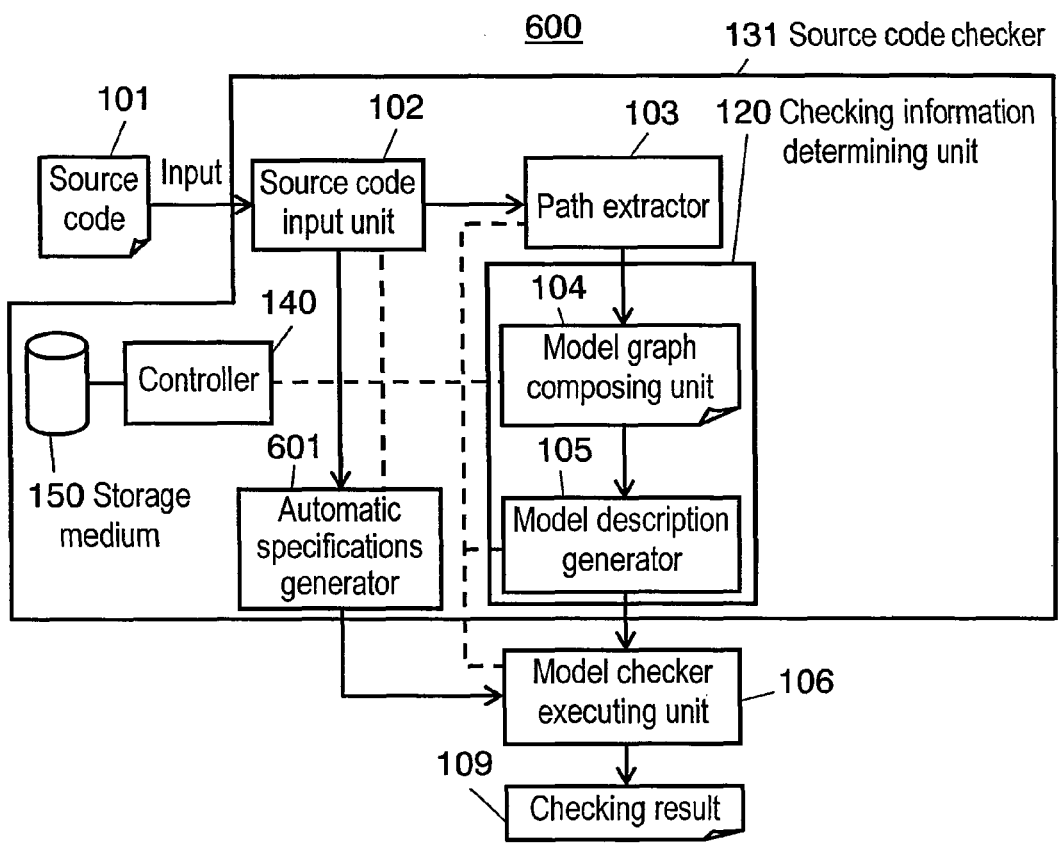
FIG. 7 illustrates source code modified from the source code shown in FIG. 2 to extract a path using CBMC, according to the second exemplary embodiment of the present invention.
FIG. 8 is a block diagram of a source code checking system including a source code checker according to the third embodiment of the present invention.

A concrete description is made for the process of path extractor 103 using FIG. 7. FIG. 7 illustrates an example of the source code shown in FIG. 2 modified to extract an execution path, in the second embodiment of the present invention.

The source code shown in FIG. 7 is the source code shown in FIG. 2 into which flag variables 504, 502 and assert statement 503 are inserted.

Path extractor 103, according to source code 101 under checking, composes a control flow graph of the source code. Next, path extractor 103 generates source code in C language to be supplied to CBMC, by modifying the input source code.

First, path extractor 103 inserts a definition statement for flag variable 504 and assignment statement 503, in the same way as in the first embodiment.

Next, path extractor 103 inserts assert statement 503 meaning that 1 is not assigned to all the flag variables inserted respectively in the above-described procedure, immediately before the statement meaning end of program included in source code 101. If three flag variables: flag1, flag2, and flag3 are present, for example, an assert statement to be inserted is "assert(flag1 !=1 || flag2 !=1 || flag3 !=1)".

Next, path extractor 103 inputs the source code obtained by modifying according to the above-described procedure, to CBMC.

If a breach of the declaration of an assert statement is indicated by CBMC, this means all the flag variables inserted can be 1. That is, an executable path can exist that passes through all the statements where 1 is assigned.

Therefore, an indication of a breach of an assert statement is the case where the assert statement is input to CBMC and the execution result includes the character string "Failed assertion:", where path extractor 103 can judge a breach of an assert statement by searching the output character string.

Path extractor 103, if a path is determined as an executable path, delivers information on the instruction series corresponding to the path, to model graph composing unit 104 included in checking information determining unit 120.

Path extractor 103 repeats the above-described procedure while changing the position where 1 is assigned to flag variable 502, to accumulate information on executable instruction series in model graph composing unit 104.

Source code checking can be performed by the execution by model graph composing unit 104 described in the first embodiment and the subsequent executions in the same way, after sufficient information is accumulated.

According to the embodiment, as described hereinbefore, path extractor 103 converts source code 101 into a logical expression and judges satisfiability of the logical expression, to extract an instruction series of source code 101 potentially executed. This enables program behaviors to be extracted without requiring actual execution of the program described in source code 101 under checking. In this way, it is not necessary to make source code under verification executable by actually compiling and linking, thus enabling model checking targeted for only a part of the source code set, unlinkable for example, out of a series of source code group.

Third Exemplary Embodiment

The third exemplary embodiment of the present invention is what is equipped with a means for automatically generating specifications to be input to a model checker executing unit according to information on the source code.

Hereinafter, a description is made for a source code checker according to the third embodiment. FIG. 8 is a block diagram of a source code checking system including the source code checker according to the third embodiment of the present invention. Here, a component with the same makeup as that in FIG. 1 is given the same mark and thus its description is omitted.

Source code checking system 600 according to the embodiment is characterized by being equipped with automatic specifications generator 601 for automatically generating specifications to be input to model checker executing unit 106 according to information on source code 101 accepted by source code input unit 102. Source code checker 131 is equipped with source code input unit 102, path extractor 103, checking information determining unit 120, automatic specifications generator 601, controller 140, and storage medium 150.

Next, a description is made for a method of automatically generating specifications by automatic specifications generator 601.

First, automatic specifications generator 601 reads source code 101 accepted by source code input unit 102, to search for statements to be used always in pairs.

When handling source code described in C language, for example, statements to be used always in pairs are those including "fopen" with "fclose", "open" with "close", and instructions for allocating memory in a heap area, such as "malloc" and "calloc", with "free".

Next, automatic specifications generator 601 adds the expression: "[](A→<>B)" to the specifications for the pair of statements A, B detected as a result of searching in the above-described procedure.

The above expression expresses the constraint that makes B appear if A appears.

If a statement with 'fp=fopen(fname, "w")' and 'fclose (fp)' in pair exists, for example, automatic specifications generator 601 adds the expression: '[]("fp=fopen(fname, "w")" →<> "fclose(fp)")' to the specifications.

Automatic specifications generator 601 repeats the above-described process for all the pair of statements detected.

Further, automatic specifications generator 601, if an expression exists as specifications and a new one is to be added thereto, links the new one using the operator"&&". The operator"&&", expressing an AND, is used to add a new constraint.

As described hereinbefore, the third embodiment, unlike the first one, dispenses with inputting specifications 108 from specifications input unit 107 by the user, thus enabling specifications meaning that an application program described in source code does not use memory incorrectly, to be automatically generated. That is, the method saves input of specifications 108, troublesome and sometimes requiring expertise.

Fourth Exemplary Embodiment

The fourth exemplary embodiment judges whether or not a potentially executed instruction series extracted uses memory incorrectly.

Figures 9, 10:
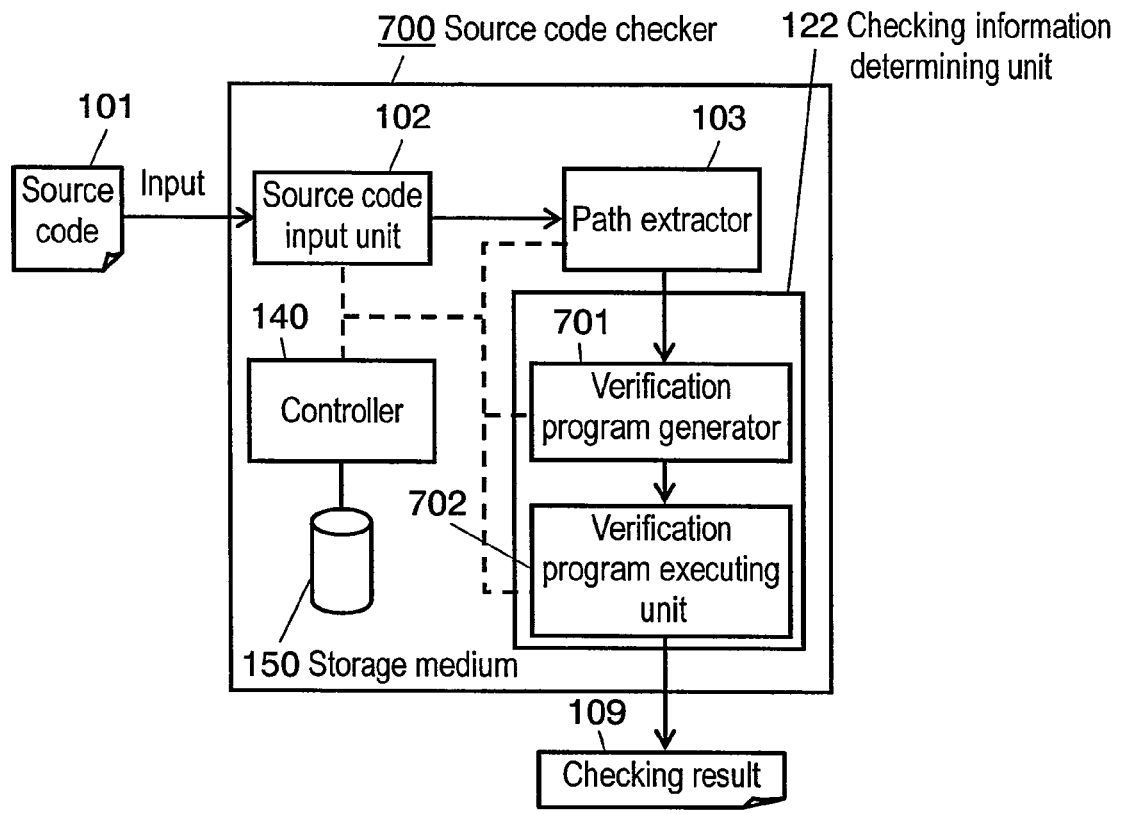
FIG. 9 is a block diagram of a source code checker according to the fourth embodiment of the present invention.
FIG. 10 illustrates an example of the verification program in the same embodiment.
Figure 14:
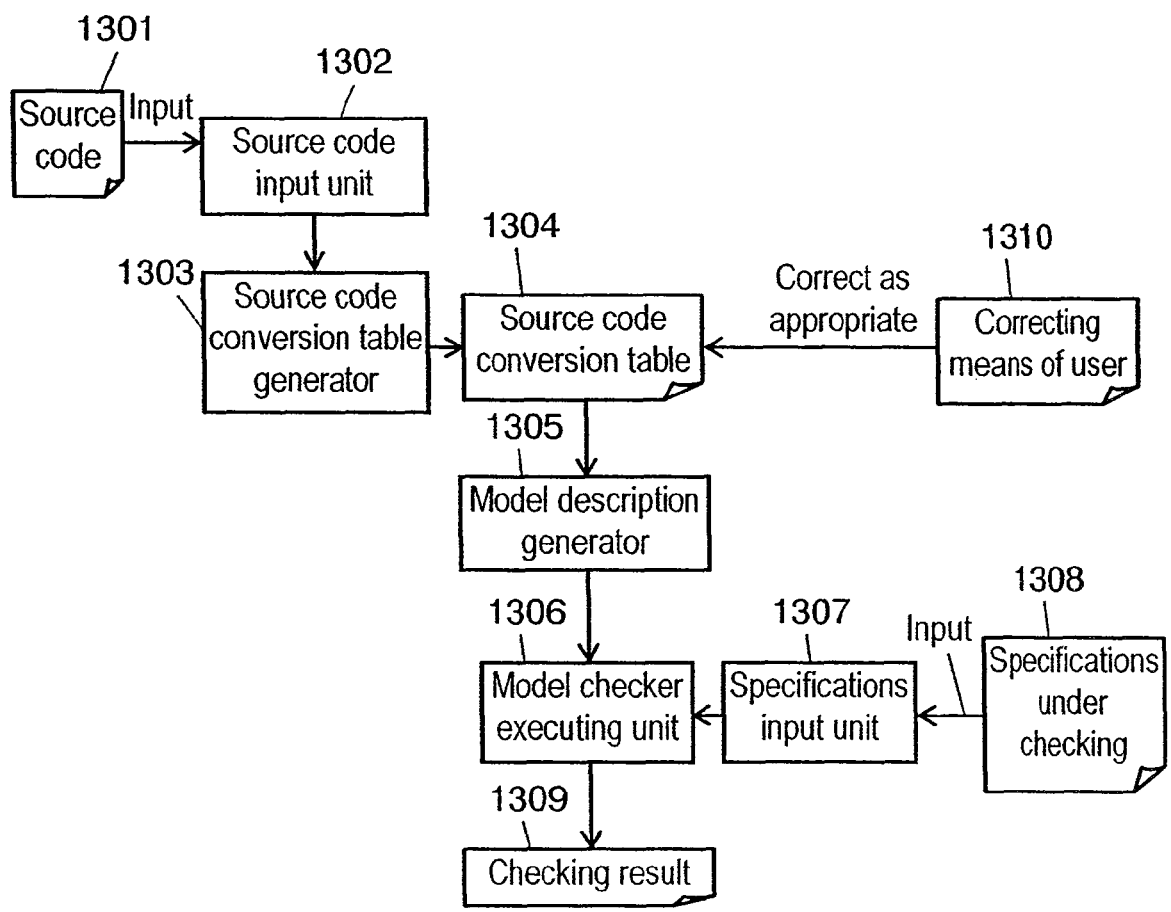
FIG. 14 is a block diagram showing the makeup of a conventional source code checker.

Hereinafter, a description is made for a source code checker according to the embodiment using FIG. 9. FIG. 9 is a block diagram illustrating the source code checker according to the embodiment. Here, a component with the same makeup as that in FIG. 1 is given the same mark and thus its description is omitted.

Source code checker 700 according to the fourth embodiment is equipped with source code input unit 102, path extractor 103, checking information determining unit 122, controller 140, and storage medium 150. Checking information determining unit 122 is equipped with verification program generator 701 and verification program executing unit 702. Verification program generator 701 receives a potentially executed instruction series extracted by path extractor 103, to generate a verification program for independently judging whether or not the instruction series uses memory incorrectly. Verification program executing unit 702 executes a verification program generated by verification program generator 701.

Next, a detailed description is made for a method of generating a verification program by verification program generator 701. A verification program generated by verification program generator 701 is composed of a character string generated according to a potentially executed instruction series extracted by path extractor 103.

A description is made for a procedure of generating this character string by verification program generator 701 using FIG. 10. FIG. 10 illustrates an example of a program generated by means of the process by verification program generator 701 according to the branch at the left of the graph shown in FIG. 5, in the embodiment.

First, verification program generator 701 assumes "int main( ){" at 1001 as a starting character string. Verification program generator 701 appends a character string to starting character string 1001 to compose character strings for a verification program. Next, verification program generator 701 sequentially appends a character string that is a statement corresponding to an instruction series generated by path extractor 103 with a semicolon added, to the above-described starting character string.

At this moment, if the function "malloc" exists as shown by 500c in FIG. 5, and additionally the functions "wz_malloc" and "free" exist as shown by 500d, 500e in FIG. 5, verification program generator 701 replaces the functions "wz_malloc" and "free" with "wz_free" as shown by 1002 in FIG. 10.

If an expression included in the instruction series includes a pointer variable, verification program generator 701 inserts a call statement for the function "wz_check" with the pointer variable as its argument before t he expression for each pointer variable.

If the last statement of the instruction series is not "return", verification program generator 701 appends "return 0;}"; if "return", appends "}" as shown by 1003 in FIG. 10.

Finally, verification program generator 701 appends the character strings shown in FIGS. 11 through 13.

Verification program generator 701 generates a verification program as described above. Then, verification program generator 701 delivers the verification program generated to verification program executing unit 702.

Verification program executing unit 702 compiles and executes the verification program delivered from verification program generator 701, to indicate the execution result as checking result 109. An indication of "Memory leak was detected." here means that an occurrence of a memory leak when instruction series extracted by path extractor 103 is executed was detected.

An indication of "Used non-active object." means that an attempt is made of using a null pointer when an instruction series extracted by path extractor 103 was detected.

According to the embodiment, as described hereinbefore, verification program generator 701 automatically generates specifications meaning that a program does not use memory incorrectly, thus enabling source code checking for incorrect use of memory without requiring knowledge on incorrect use of memory. Further, the embodiment enables checking for incorrect use of memory by a program without requiring specifications input unit 107 in the first embodiment.

Further, the embodiment dispenses with model checker executing unit 106 in the first embodiment by outputting a program for independently executing source code checking, namely dispenses with using an external model checker, thus improving portability and convenience.

INDUSTRIAL APPLICABILITY

As described above, the present invention enables source code checking without deviating from program behaviors meant by the source code. The invention implements a more accurate source code checking without deviating from program behaviors meant by the source code under checking. Further, the present invention has an extending applicability such as a field of correctness checking for software.

The invention claimed is:

1. A method of checking source code for a computer program comprising:
a path extracting step that extracting an instruction series from the source code along an execution path representing an order for executing the instruction series, the execution path determined by simulating execution of the source code; and
a checking information determining step that generating checking information of the source code according to the instruction series extracted in the path extracting step, the checking information corresponding to memory usage of the source code or indicating that the source code has been executed correctly, wherein the checking information determining step includes:
a model graph composing step that composing a model graph from the instruction series extracted in the path extracting step; and
a model description generating step that generating a model description from the model graph composed in the model graph composing step, wherein
both the model graph composing step and the model description generating step are placed before a model checking executing step that performing model checking of the source code according to the model description and specifications expressing a property of checking the source code; and wherein
checking of the source code is performed in the model checking executing step according to the model description generated by the model description generating step and preliminarily input specifications.

2. The method of checking source code of claim 1, wherein the path extracting step extracts the instruction series by converting the source code into a logical expression and by judging a condition of the logical expression.

3. The method of checking source code of claim 1, further comprising an automatic specifications generating step for automatically generating the specifications, wherein the preliminarily input specifications are those generated in the automatic specifications generating step.

4. The method of checking source code of claim 3, wherein the automatic specifications generating step automatically generates the specifications such that the source code does not use memory incorrectly.

5. The method of checking source code of claim 1, wherein the checking information determining step includes:
a verification program generating step for generating a verification program for verifying whether the instruction series extracted in the path extracting step correctly uses memory; and
a verification program executing step for executing the verification program generated in the verification program generating step.

6. A non-transitory computer readable medium including a program causing a computer to execute a method of checking source code for a computer program comprising:
a path extracting step for extracting an instruction series from the source code along an execution path representing an order for executing the instruction series, the execution path determined by simulating execution of the source code; and
a checking information determining step for generating checking information of the source code according to the instruction series extracted in the path extracting step, the checking information corresponding to memory usage of the source code or indicating that the source code has been executed correctly, wherein the checking information determining step includes:
a model graph composing step for composing a model graph from the instruction series extracted in the path extracting step; and
a model description generating step for generating a model description from the model graph composed in the model graph composing step, wherein
both the model graph composing step and the model description generating step are placed before a model checking executing step for performing model checking of the source code according to the model description and specifications expressing a property of checking the source code; and wherein
checking of the source code is performed in the model checking executing step according to the model description generated by the model description generating step and preliminarily input specifications.

7. A source code checker executed by a processor, for checking source code for a computer program, the source code checker comprising:
- a path extractor programmed to extract an instruction series from the source code along an execution path representing an order for executing the instruction series, the execution path determined by simulating execution of the source code; and
- a checking information determining unit generating checking information of the source code according to the instruction series extracted by the path extractor, the checking information corresponding to memory usage of the source code or indicating that the source code has been executed correctly, wherein the checking information determining unit is placed before a model checker executing unit for performing model checking of the source code according to a model description and specifications expressing a property of checking the source code, and includes:
- a model graph composing unit for composing a model graph from the instruction series extracted by the path extractor; and
- a model description generator for generating the model description from the model graph composed by the model graph composing unit, and wherein the model checker executing unit checks the source code according to the model description generated by the model description generator and preliminarily input specifications.

8. The source code checker of claim 7, wherein the path extractor extracts the instruction series by converting the source code into a logical expression and by judging a condition of the logical expression.

9. The source code checker of claim 7, further comprising an automatic specifications generator for automatically generating the specifications, wherein the preliminarily input specifications are those generated by the automatic specifications generator.

10. The source code checker of claim 9, wherein the automatic specifications generator automatically generates the specifications such that the source code does not use memory incorrectly.

11. The source code checker of claim 9, wherein the checking information determining unit includes:
- a verification program generator for generating a verification program for verifying whether the instruction series extracted by the path extractor correctly uses memory; and
- a verification program executing unit for executing the verification program generated by the verification program generating part.

* * * * *

UNITED STATES PATENT AND TRADEMARK OFFICE
CERTIFICATE OF CORRECTION

PATENT NO.         : 8,020,153 B2
APPLICATION NO.    : 11/575824
DATED              : September 13, 2011
INVENTOR(S)        : Aoshima et al.

It is certified that error appears in the above-identified patent and that said Letters Patent is hereby corrected as shown below:

In column 16, line 16 of the Letters Patent, in claim 11, "The source code checker of claim 9," should read --The source code checker of claim 7,--.

Signed and Sealed this
Third Day of July, 2012

David J. Kappos
*Director of the United States Patent and Trademark Office*